(12) United States Patent
Makino

(10) Patent No.: US 7,641,267 B2
(45) Date of Patent: Jan. 5, 2010

(54) HARNESS PROTECTING STRUCTURE FOR VEHICULAR HORN

(75) Inventor: Hiroaki Makino, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 40 days.

(21) Appl. No.: 12/146,957

(22) Filed: Jun. 26, 2008

(65) Prior Publication Data
US 2009/0001736 A1 Jan. 1, 2009

(30) Foreign Application Priority Data
Jun. 28, 2007 (JP) ............... 2007-170966

(51) Int. Cl.
B62D 25/08 (2006.01)
(52) U.S. Cl. ............... 296/193.1; 296/193.09
(58) Field of Classification Search ............ 296/193.1, 296/193.09, 203.02, 208; 180/68.6; 340/391.1
See application file for complete search history.

(56) References Cited

U.S. PATENT DOCUMENTS

| | | | | |
|---|---|---|---|---|
| 4,281,224 A | * | 7/1981 | Castagna | 381/391 |
| 4,412,593 A | * | 11/1983 | Taira | 180/68.6 |
| 5,970,158 A | * | 10/1999 | Beltran | 381/341 |
| 6,347,823 B1 | * | 2/2002 | Ozawa et al. | 296/193.09 |
| 7,258,385 B2 | * | 8/2007 | Andre et al. | 296/64 |
| 7,553,552 B2 | * | 6/2009 | Oba et al. | 428/626 |
| 7,571,957 B2 | * | 8/2009 | Povinelli et al. | 296/193.09 |

FOREIGN PATENT DOCUMENTS

| | | |
|---|---|---|
| JP | 63-23238 | 6/1988 |
| JP | 2000-103303 | 4/2000 |
| JP | 2004-330852 | 11/2004 |

* cited by examiner

Primary Examiner—Glenn Dayoan
Assistant Examiner—Gregory Blankenship
(74) Attorney, Agent, or Firm—Alston & Bird LLP

(57) ABSTRACT

A harness protecting structure is provided for a vehicular horn for a vehicle, in which the vehicle has a grille defining an air intake opening in a front part of the vehicle, a radiator located posterior to the grille, and the horn being disposed in front of the radiator and facing the opening of the grille. The grille is provided with a peripheral wall, the peripheral wall extending posterior to the lower and side edge of the grill, and a part of the peripheral wall extending across and anterior to a peripheral region of the horn so as to form a protective surface. The harness of the horn is laid from the outside of the region of the horn behind the protective surface.

6 Claims, 4 Drawing Sheets

HARNESS PROTECTING STRUCTURE FOR VEHICULAR HORN

FIELD OF THE INVENTION

The present invention relates to a harness protecting structure for a vehicular horn, which is arranged inside a radiator grille that forms an outside air intake opening in the front part of a vehicle.

BACKGROUND OF THE INVENTION

A radiator grille, disposed in the front part of a vehicle body, has an opening divided into small sections to prevent foreign matter from entering into an engine chamber, but allows outside air to enter into a radiator and the engine chamber for cooling. FIG. 1 shows a honeycomb louver type radiator grille 2 disposed in the slanted front part of the vehicle body. Such a radiator grille has a problem in that the lower the portion thereof, the larger the space between the radiator grille and the radiator (5) because of the slant, and due to this space, the interior of the engine chamber is undesirably visible through the radiator grille.

In addition, a horn (6) may be used by the driver as an alarm for alerting other vehicles or pedestrians, and the horn is generally disposed inside of the radiator grille or the engine chamber. In recent years, security systems using horns have been put to practical use. The security system sounds the horn at a high volume to issue an alarm to the surrounding area when a parked vehicle is forcibly unlocked for the purpose of theft, etc. However, situations have arisen in which an experienced criminal who is familiar with such security systems executes a crime after making the horn inoperative by inserting a cutting tool through the opening of the radiator grille in advance and cutting the horn harness.

In order to provide the alarm sound with a sufficient sound pressure, the horn is advantageously arranged near the grille opening (refer to Japanese Utility Model Publication No. 63-23238); however, consideration has not been given to the above-mentioned circumstances. Usually, the radiator is disposed at the rear of the radiator grille, and a horn harness that is disposed in front of the radiator must be laid so as to go around the side of the radiator, and this makes access to the harness from the outside easy. The horn is sometimes arranged at a position hidden by a bumper or an engine hood (refer to Japanese Patent Application, First Publication No. 2000-103303 and Japanese Patent Application, First Publication No. 2004-330852). In this case, the alarm sound inevitably has a tendency to be muffled on the inside of the bumper or the engine hood. Even if the horn is arranged at a somewhat distant position, a radical solution to the above-mentioned situation is not achieved.

BRIEF SUMMARY OF THE INVENTION

The present invention has been made in view of the above circumstances, and accordingly, an object thereof is to provide a harness protecting structure for a vehicular horn, which is arranged at the rear of a grille in the front part of a vehicle and can prevent a harness from being cut by a cutting tool inserted through a grille opening, while at the same time providing an alarm sound with a sufficient sound pressure.

To achieve the above object, the present invention provides a harness protecting structure for a vehicular horn on a vehicle, the vehicle having a grille defining an air intake opening in the front part of the vehicle and a radiator located posterior to the grille, the horn being disposed in front of the radiator and facing the opening of the grille, wherein the grille is provided with a peripheral wall, the peripheral wall extending posterior to the lower and side edge of the grill, and a part of the peripheral wall extending across and anterior to a peripheral region of the horn so as to form a protective surface; and the harness of the horn is laid from the outside of the peripheral region of the horn behind the protective surface.

Since the harness protecting structure for a vehicular horn in accordance with the present invention is configured as described above, the harness can be prevented from being cut by a malicious person because the harness is disposed so as to go around the radiator and is hidden by the peripheral wall and cannot be seen from the outside, and also the harness is protected from a cutting tool being inserted through the opening of grille by means of the peripheral wall and thereby the access to the harness is made impossible, and the horn is arranged posterior to the grille in the vehicle front part and facing to the opening so that the alarm sound can be provided with a sufficient sound pressure.

In the present invention, in a mode in which the peripheral wall is formed with a swelled surface that is continuous with the protective surface and projects anterior to the lower part of the horn, by a trough-shaped surface formed along the outer periphery of the horn by the protective surface and the swelling surface, the alarm sound of the horn can be transmitted reliably to the front without being dissipated in an engine chamber, and can be generated to the outside of vehicle efficiently.

Also, in the present invention, in a mode in which the peripheral wall is formed by an inner cover attached to the grille, the opening shape of the grille and the shape around the protective surface can be formed easily.

Furthermore, in the present invention, in a mode in which the inner cover is provided with an upper wall extending in the vehicle width direction along the upper edge of the grille, and a notch corresponding to the external shape of the horn is formed in the upper wall anterior to the horn, the alarm sound of the horn can be generated to the outside of vehicle efficiently through the notch, while the upper part of the horn is protected by the upper wall.

DETAILED DESCRIPTION OF THE INVENTION

An embodiment of the present invention will now be described in detail with reference to the accompanying drawings.

Figure 1:
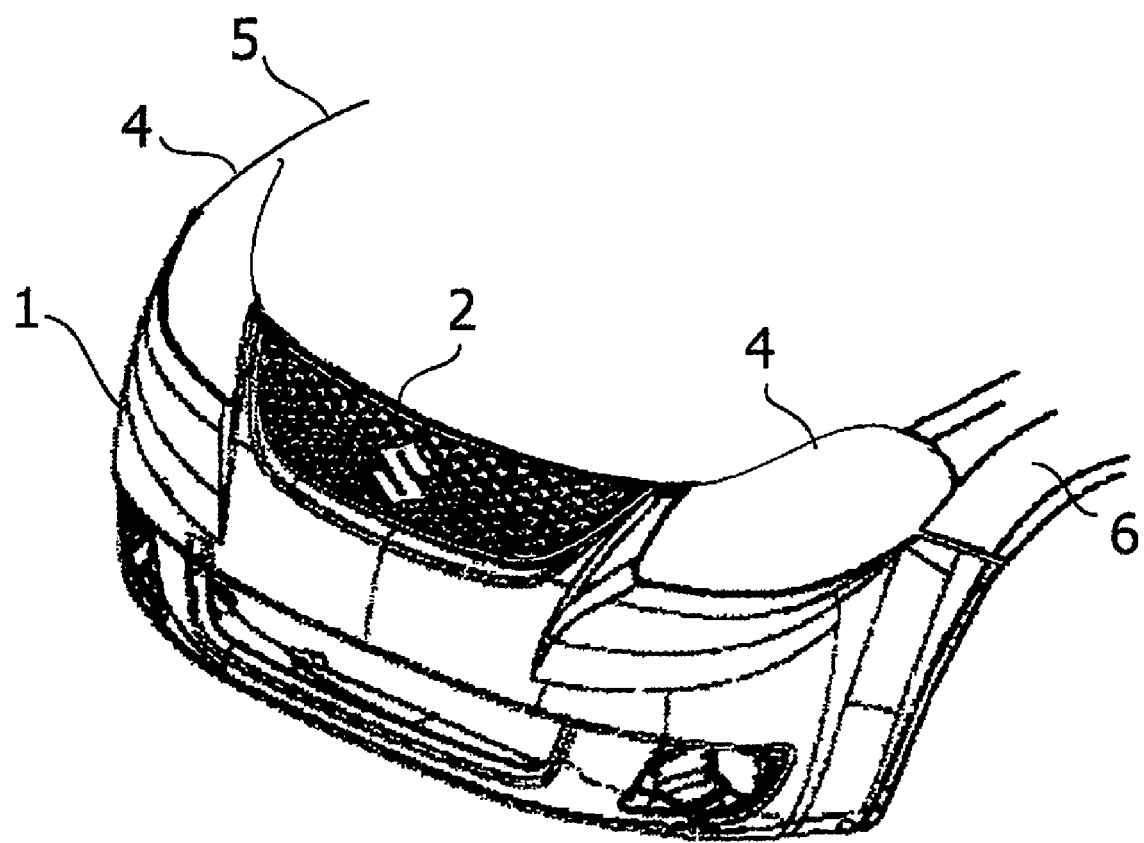
FIG. 1 is a perspective view showing the front part of an automobile to which the harness protecting structure in accordance with the present invention is applied.

FIG. 1 is a perspective view showing the front part of an automobile provided with a horn to which a harness protecting structure in accordance with the present invention is applied. In FIG. 1, in the front part of the automobile, a bumper fascia 1 is provided, and a radiator grille 2 is mounted in an opening 10 formed in the upper part of the bumper fascia 1. An upper edge portion 23 of the radiator grille 2 is adjacent to the front end edge of an engine hood 5 that covers an engine chamber, and headlamps 4 are disposed on both sides of the radiator grille 2. The bumper fascia 1 extends to both sides along the lower edges of the headlamps 4, and both end portions thereof are adjacent to fenders 6.

Figure 2:
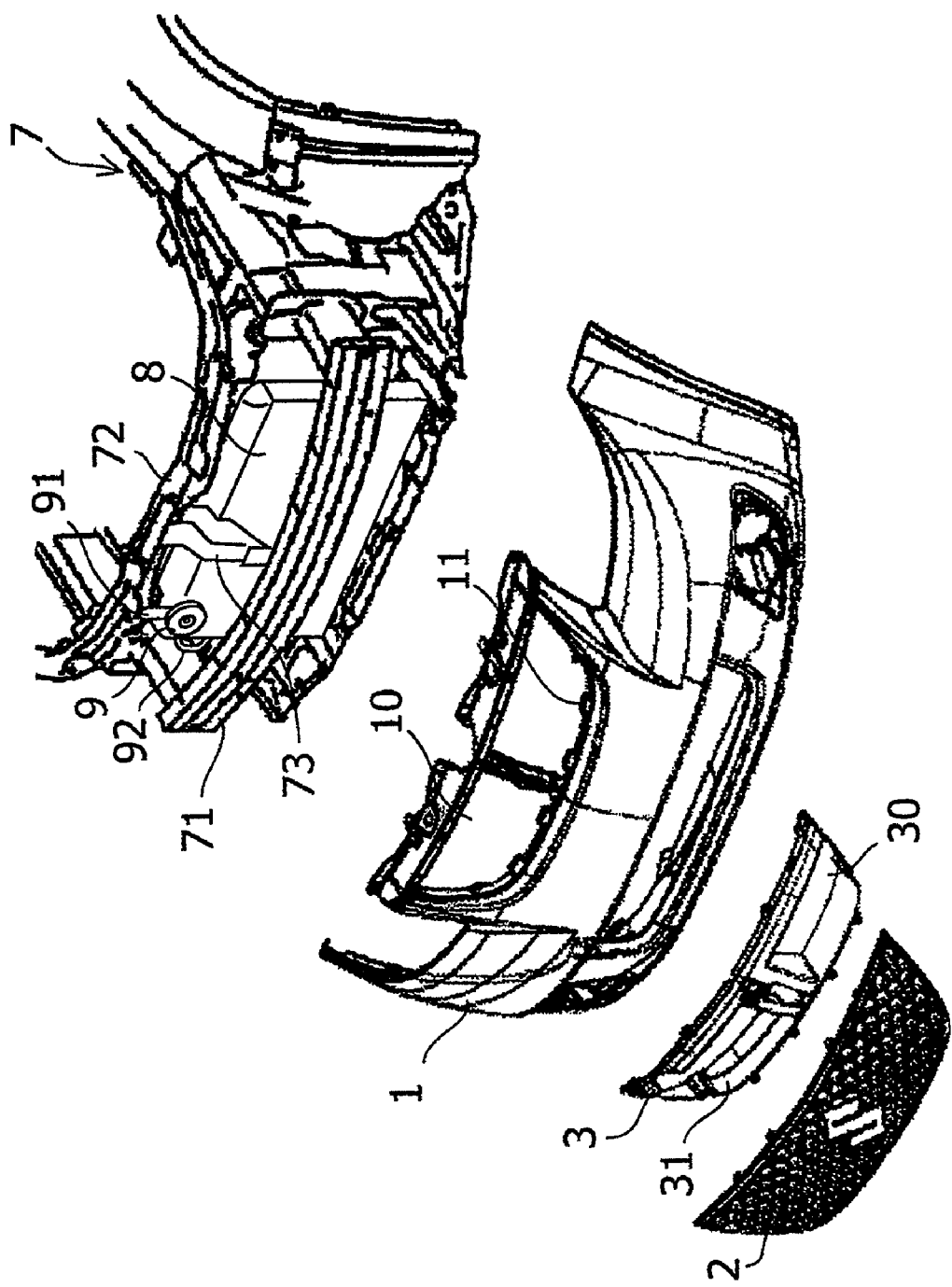
FIG. 2 is a perspective view showing a disassembled state of the front part of an automobile.

FIG. 2 shows a disassembled state of the front part of the automobile. In FIG. 2, in the foremost part of a vehicle body 7, a reinforcement 71 and a core support 72 are provided so as to extend in the vehicle width direction. In the center of the core support 72, a hood lock support 73 is provided integrally, and the lower end thereof is connected to the reinforcement 71. At the rear of the reinforcement 71 and the hood lock support 73, a radiator 8 supported by the core support 72 is disposed.

A horn 9 is attached to the lower end of a stay 91. The stay 91 extends downward from one side of the core support 72, and the horn 9 is disposed in front of the upper side portion of the radiator 8. Therefore, a harness 92 for supplying power to the horn 9 is pulled out once from the back surface of the horn 9 to the side, and it is laid around the side of the radiator 8. As previously described, this layout provides ease of access to the harness from the outside.

The bumper fascia 1 is disposed to cover the front side of the reinforcement 71, and the opening 10 is provided on the upper side of a portion corresponding to the reinforcement 71. Around the opening 10, an attachment portion 11 is provided for the radiator grille 2. The entire surface of the radiator grille 2 is provided with opening 20 divided into small sections to prevent foreign matter from entering into the engine chamber, but allows outside air to enter the engine chamber through the opening 20. In the example shown in the figures, between the upper edge portion 23 that is adjacent to the front end edge of the engine hood 5 and extends substantially linearly in the vehicle width direction and a lower edge portion 21 consisting of a central portion extending substantially horizontally and an inclined portion smoothly continuous with both sides of the central portion, a honeycomb lattice portion 2 is formed into a honeycomb louver shape.

The radiator grille 2 configured as described above has an inclination corresponding to the slanted shape of a front part of the vehicle, and thereby, the closer to the lower edge portion 21, the larger the space between the radiator grille 2 and the radiator 8. Therefore, conventionally, the upper surface of the reinforcement 71 and the like are undesirably visible from the outside through the radiator grille 2. In particular, in the case in which the radiator grille 2 has a dark color, such as black, if the paint color of the vehicle body including the reinforcement 71, the core support 72, and the hood lock support 73, is a bright color such as white, the appearance of the vehicle front part is greatly deteriorated.

Accordingly, an inner cover 3 is mounted on the back surface of the radiator grille 2. The inner cover 3 has a function as an inlet for guiding outside air into the radiator 8 and the engine chamber to improve the cooling performance of engine, and also has a function as a screen for the reinforcement 71, the core support 72, and the hood lock support 73.

The inner cover 3 has an external shape that is almost the same as that of the radiator grille 2, and has a peripheral wall 31 (a shelflike surface) extending posterior to the lower and side edge portion thereof attached to the back surface of the radiator grille 2. In the finally attached state shown in FIG. 3, the peripheral wall 31 is positioned above the reinforcement 71, and it functions as a screen for the reinforcement 71. The central portion of the inner cover 3, which divides an opening 30 thereof into two right and left sections, covers the hood lock support 73.

Figure 3:
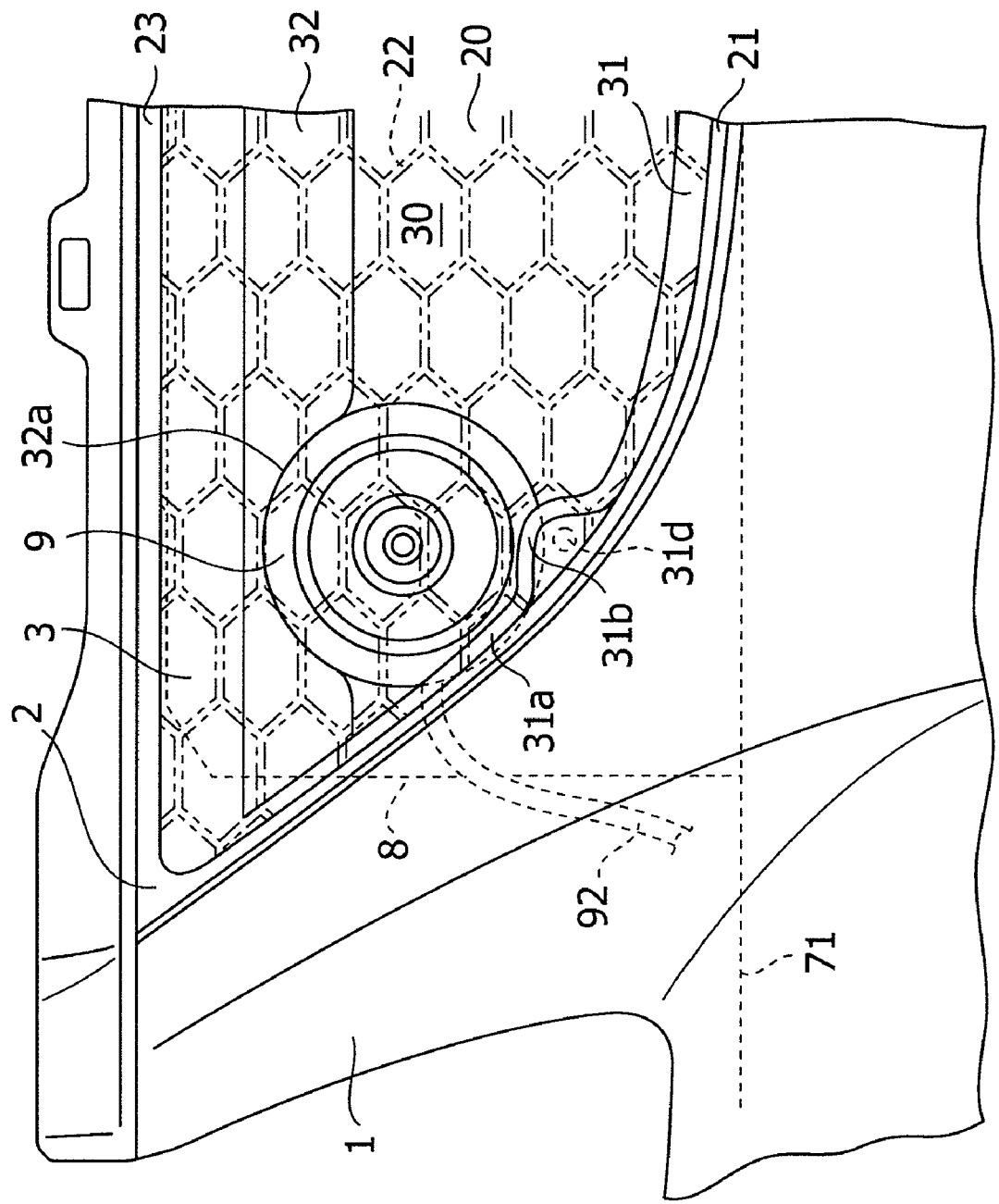
FIG. 3 is a front view showing a radiator grille to which a harness protecting structure for a vehicular horn in accordance with the present invention is applied.
Figure 4:
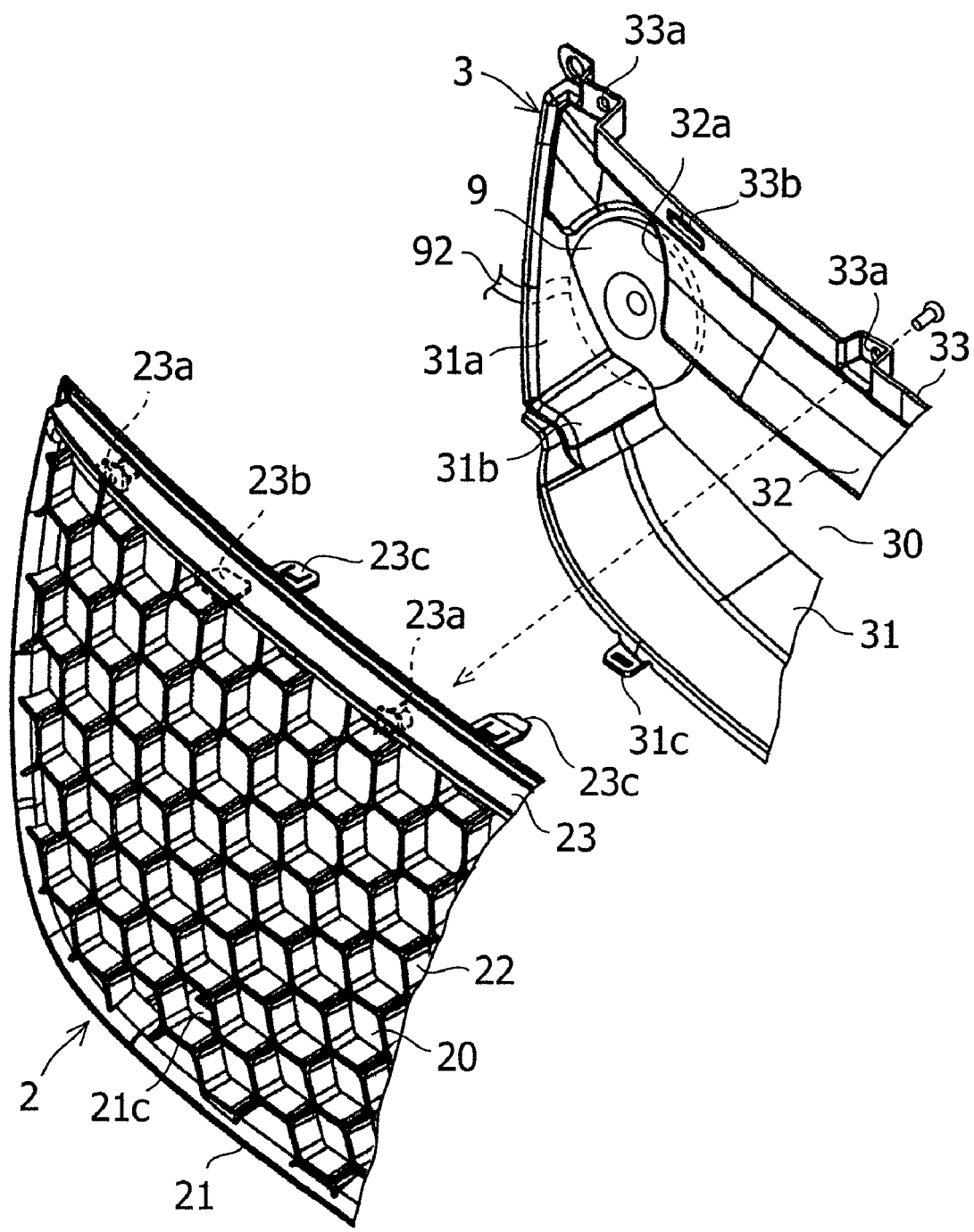
FIG. 4 is a perspective view of an essential portion, showing a disassembled state of a radiator grille and an inner cover and showing the positional relationship with a horn.

In addition, both right and left sides of the peripheral wall 31 are continuous with side wall portions 31a curvedly inclined upward. In the finally attached state, as shown in FIGS. 3 and 4, the side wall portion 31a extends close to the front surface of the horn 9 and obliquely crosses the lower part of the horn 9. From the back surface of the region in which the side wall portion 31a crosses, the harness 92 is laid to the side.

Therefore, the harness 92 cannot be seen from the outside due to the side wall portion 31a, and also, a cutting tool, etc., inserted from the outside of the radiator grille 2, cannot reach the harness 92. That is to say, the side wall portions 31a of the peripheral wall 31 form a protective surface for the harness 92 for the horn 9.

Furthermore, in the lower part of the side wall portion 31a of the peripheral wall 31, a swelled surface 31b is formed which swells from the side wall portion 31a smoothly curved along the lower edge portion 21 of the radiator grille 2. As shown in FIG. 3, the swelled surface 31b swells to the front surface lower part of the horn 9, and forms the protective surface over a wider angle together with the side wall portion 31a. In particular, the swelled surface 31b is effective in preventing a cutting tool, etc., from reaching the harness 92 from the lower side of the horn 9.

On the other hand, along the lower side of an upper edge portion 33 of the inner cover 3, an upper wall surface 32 extending in the vehicle width direction is provided. The upper wall surface 32 has an inclination along the back surface of the radiator grille 2, and in the finally attached state, is joined to the back surface of the radiator grille 2. The upper wall surface 32 has a function as a screen for preventing the upper portion of the radiator 8, the attachment portion to the core support 72, and the like from being visible from the outside.

Also, as shown in FIGS. 3 and 4, in a portion corresponding to the horn 9 of the upper wall surface 32, a notch 32a along the external shape of the horn 9 is formed. In the finally attached state, the upper front surface of the horn 9 is opened, so that not only is the alarm sound not hindered, but also the back of the horn 9 cannot be seen from above, and a cutting tool, etc., can be effectively prevented from reaching the harness 92 from the upper side.

As shown in FIG. 4, the inner cover 3 configured as described above is mounted on the back surface of the radiator grille 2 by a method as described below. Claw portions 23b are provided projecting on the upper back surface of the radiator grille 2 and are inserted into slits 33b provided in the upper edge portion 33, and locking pieces 31c are provided in a lower edge portion (31) and are locked to locking portions (21c) of the radiator grille 2 to temporarily fix the inner cover 3 to the radiator grille 2. Then, screws inserted into holes 33a are threadedly tightened to engagement portions 23a of the radiator grille 2.

The radiator grille 2 to which the inner cover 3 has been mounted integrally in advance as described above is fixed to the opening 10 of the bumper fascia 1 by locking pieces 21c, which are also used as the locking portions, in the lower edge portion 21 and locking pieces 23c provided in the upper edge portion 23 to the attachment portion 11 around the opening 10 of the bumper fascia 1 and by threadedly engaging the radiator grille 2 with the bumper fascia 1 with screws (not shown). As shown in FIG. 3, one screw hole 31d of a plurality of screw holes for fixing the radiator grille 2 is provided on the lower side of the swelled surface 31b. Thereby, the rigidity of the protective surface 31a,31b ranging from the side wall portion 31a to the swelled surface 31b is improved. Therefore, since the deformation is restrained, a more reliable protecting effect can be achieved.

In addition, since the protective surface 31*a*,31*b* is disposed so as to avoid the central portion of the horn 9, the alarm sound is not hindered from being generated toward the front. Instead, the alarm sound is effectively transmitted to the front by the trough-shaped protective surface 31*a*,31*b* extending linearly from a portion near the sound-generating part of the horn 9 to the front (having a slightly downward inclination), so that the protective surface 31*a*,31*b* is also advantageous in preventing the sound pressure from being decreased by the diffusion to the engine chamber side.

The above is a description of one embodiment of the present invention. The present invention is not limited to the above-described embodiment. Various modifications and changes based on the technical concept of the present invention can be made.

For example, at least one of the peripheral wall surfaces 31 of the inner cover 3, the side wall portion 31*a*, and the swelled portion 31*b* can be formed integrally on the radiator grille 2 side. In addition, depending on the shape of the radiator grille, a portion corresponding to any other part or the entirety of the peripheral wall surface 31 and further the entirety of the inner cover excluding the central portion corresponding to the hood lock support 73 can be formed integrally on the radiator grille 2 side.

What is claimed is:

1. A harness protecting structure for a vehicular horn of a vehicle, the vehicle having a grille defining an air intake opening in a front part of the vehicle and a radiator located posterior to the grille, the horn being disposed in front of the radiator and facing the opening of the grille, wherein the grille is provided with a peripheral wall, the peripheral wall extending posterior to the lower and side edge of the grill, and a part of the peripheral wall extending across and anterior to a peripheral region of the horn so as to form a protective surface; and the harness of the horn is laid from the outside of the periphery region of the horn behind the protective surface.

2. The harness protecting structure for a vehicular horn according to claim 1, wherein the peripheral wall is formed with a swelled surface which is continuous with the protective surface and projects anterior to the lower part of the horn.

3. The harness protecting structure for a vehicular horn according to claim 1, wherein the peripheral wall is formed by an inner cover attached to the grille.

4. The harness protecting structure for a vehicular horn according to claim 3, wherein the inner cover is provided with an upper wall extending in the vehicle width direction along the upper edge of the grille, and a notch corresponding to the external shape of the horn is formed in the upper wall anterior to the horn.

5. The harness protecting structure for a vehicular horn according to claim 2, wherein the peripheral wall is formed by an inner cover attached to the grille.

6. The harness protecting structure for a vehicular horn according to claim 5, wherein the inner cover is provided with an upper wall extending in the vehicle width direction along the upper edge of the grille, and a notch corresponding to the external shape of the horn is formed in the upper wall anterior to the horn.

* * * * *